T. B. RUSSELL.
Gear Cutter.

No. 67,219.

Patented July 30, 1867.

WITNESSES:
John A. Bassett
George B. Appleton

INVENTOR
T. B. Russell.

United States Patent Office

THOMAS B. RUSSELL, OF SALEM, MASSACHUSETTS.

Letters Patent No. 67,219, dated July 30, 1867

IMPROVEMENTS IN GEAR-CUTTING WHEELS.

*The Schedule referred to in these Letters Patent and making part of the same.*

TO ALL WHOM IT MAY CONCERN:

Be it known that I, THOMAS B. RUSSELL, of Salem, in the county of Essex, and State of Massachusetts, have invented a new and useful Machine for Cutting the Teeth of Wheels; and I do hereby declare that the following is a full, clear, and exact description of the construction and operation of the same, reference being had to the annexed drawings, making a part of this specification, of which—

Figure 1:
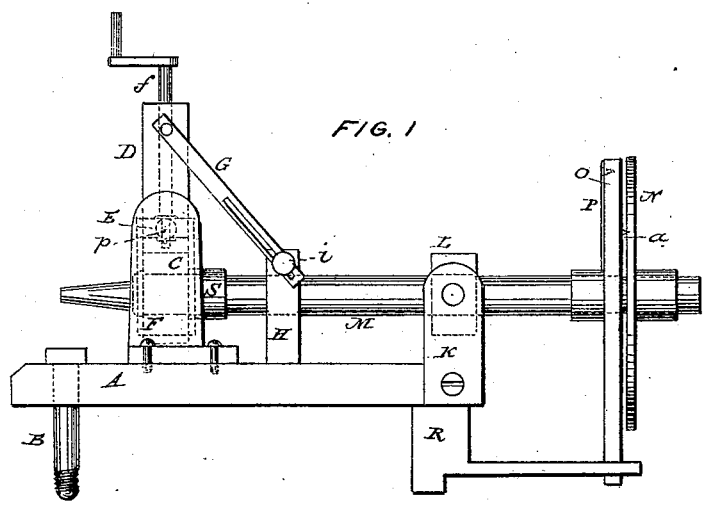

Figure 1 is a longitudinal elevation, and

Figure 2:
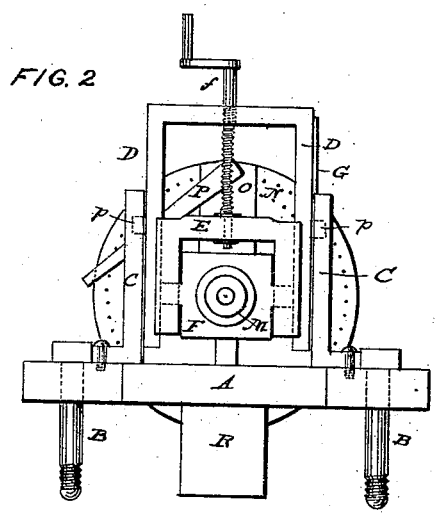

Figure 2 a front elevation, in which the parts chiefly constituting my invention are clearly shown and easily designated.

To enable others skilled in the art to make and use my invention, I will proceed to describe its construction and operation.

It is designed to be placed upon a lathe when used for cutting the teeth of wheels. The cutter and appurtenances thereto being attached to the lathe, form no part of my invention.

The machine is made of iron and brass. A is the base, and is to be secured to a lathe-bed by the bolts B. Two stands C have between them a swing-brace, D, a sliding-frame, E, and a pivoted box, F. The swing-brace D is confined between the two stands C by pivots $p$, and can be set at any desired angle and fastened by the link G to the post H, by the screw I, and the sliding-frame E can be moved up and down in the swing-brace D by the screw $f$. At a proper distance from the stands C are two more stands K, (one shown in fig. 1,) and between them is another pivoted box, L, seen in fig. 1. Through the two pivoted boxes F and L a spindle, M, is made to fit nicely. On the back end of the spindle M is an index, N, and a point-holder, O. On the upper end of the point-holder O is a spring, P, to which a point, $a$, is attached for holding the index N. The lower end of the point-holder O works in a slotted block, R, and prevents the spindle M from turning when a wheel is being cut. On the spindle M is a movable ferrule, S, to be set up against the pivoted box F when cutting a bevelled wheel. The spindle M is rigidly secured to the box F by a shoulder on the end of it and the ferrule S, which should be placed close against the box F while cutting the teeth of bevelled wheels. The shoulder and ferrule are designed to secure the spindle M from any lateral motion, and the pointer $a$, of the index N, will secure the spindle M from any revolving motion during the operation of cutting the teeth of wheels.

To cut a bevelled wheel it is only necessary to set the swing-brace D at an angle to correspond with the angle or bevel of the wheel to be cut, and move the sliding-frame E, containing the pivoted box F, up and down in the swing-brace D by the screw $f$, and the tooth will be cut perfect.

Having thus fully described the nature of my invention, what I claim as new, and desire to secure by Letters Patent, is—

1. The combination of the spindle M, pivoted boxes F and L, the sliding-frame E, and the swing-brace D, for the purpose specified.

2. The improved apparatus when the several parts are made and arranged substantially as described, and used for the purpose set forth.

T. B. RUSSELL.

Witnesses:
JOHN A. BASSETT,
GEORGE B. APPLETON.